US011660812B2

(12) United States Patent
Kalpio et al.

(10) Patent No.: US 11,660,812 B2
(45) Date of Patent: May 30, 2023

(54) MODULAR SYSTEMS AND METHODS FOR PERFORMING ADDITIVE MANUFACTURING OF OBJECTS

(71) Applicant: Brinter Oy, Turku (FI)

(72) Inventors: Tomi Kalpio, Turku (FI); Marko Piira, Halikko (FI)

(73) Assignee: Brinter Oy, Turku (FI)

( * ) Notice: Subject to any disclaimer, the term of this patent is extended or adjusted under 35 U.S.C. 154(b) by 60 days.

(21) Appl. No.: 17/232,307

(22) Filed: Apr. 16, 2021

(65) Prior Publication Data

US 2021/0229351 A1 Jul. 29, 2021

Related U.S. Application Data

(63) Continuation of application No. 16/182,042, filed on Nov. 6, 2018, now Pat. No. 10,981,328.

(51) Int. Cl.
*B29C 64/25* (2017.01)
*B33Y 10/00* (2015.01)
(Continued)

(52) U.S. Cl.
CPC .............. *B29C 64/25* (2017.08); *B22F 10/00* (2021.01); *B22F 10/20* (2021.01); *B22F 10/31* (2021.01);
(Continued)

(58) Field of Classification Search
CPC ....... B29C 64/25; B29C 64/153; B29C 64/20; B29C 64/379; B29C 64/393;
(Continued)

(56) References Cited

U.S. PATENT DOCUMENTS

2007/0057412 A1 3/2007 Weiskopf et al.
2014/0246809 A1 9/2014 Hofmann et al.
(Continued)

FOREIGN PATENT DOCUMENTS

CN 104640686 B 1/2018
CN 108367351 A 8/2018

OTHER PUBLICATIONS

China National Intellectual Property Administration, First Office Action, Application No. 201980072173.5, dated Aug. 5, 2022, 11 pages.
(Continued)

*Primary Examiner* — Nahida Sultana
(74) *Attorney, Agent, or Firm* — Ziegler IP Law Group LLC

(57) ABSTRACT

A modular system for performing additive manufacturing of an object includes at least two additive manufacturing devices, each having a housing with two slots on lateral sides to accommodate a manufacturing tray; a printer head and axis system; and a movement mechanism. A control module is operatively coupled to each of the at least two additive manufacturing devices. The control module is configured to control the at least two additive manufacturing devices to arrange the manufacturing tray in a first of the at least two additive manufacturing devices; print a part of the object on the manufacturing tray arranged in the first additive manufacturing device; move the manufacturing tray having the partially manufactured object to a second of the at least two additive manufacturing devices; and print a remaining part of the object on the manufacturing tray to complete the additive manufacturing of the object.

5 Claims, 4 Drawing Sheets

(51) Int. Cl.
*B33Y 30/00* (2015.01)
*B33Y 50/02* (2015.01)
*B29C 64/379* (2017.01)
*B29C 64/153* (2017.01)
*B29C 64/20* (2017.01)
*B29C 64/393* (2017.01)
*B22F 10/20* (2021.01)
*B22F 10/00* (2021.01)
*B22F 12/00* (2021.01)
*B22F 12/80* (2021.01)
*B22F 12/88* (2021.01)
*B22F 12/90* (2021.01)
*B22F 10/31* (2021.01)
*B22F 10/10* (2021.01)

(52) U.S. Cl.
CPC .............. *B22F 12/38* (2021.01); *B22F 12/80* (2021.01); *B22F 12/88* (2021.01); *B22F 12/90* (2021.01); *B29C 64/153* (2017.08); *B29C 64/20* (2017.08); *B29C 64/379* (2017.08); *B29C 64/393* (2017.08); *B33Y 10/00* (2014.12); *B33Y 30/00* (2014.12); *B33Y 50/02* (2014.12); *B22F 10/10* (2021.01); *B22F 12/22* (2021.01)

(58) Field of Classification Search
CPC ........ B29C 64/364; B22F 10/00; B22F 10/20; B22F 10/31; B22F 12/38; B22F 12/80; B22F 12/88; B22F 12/90; B22F 10/10; B22F 12/22; B33Y 10/00; B33Y 30/00; B33Y 50/02; Y02P 10/25
See application file for complete search history.

(56) References Cited

U.S. PATENT DOCUMENTS

| | | | |
|---|---|---|---|
| 2015/0183166 A1* | 7/2015 | Yoo ....................... | B29C 64/176 |
| | | | 425/375 |
| 2016/0185047 A1 | 6/2016 | Windau et al. | |
| 2017/0144874 A1 | 5/2017 | Huebinger et al. | |
| 2017/0297321 A1 | 10/2017 | Swanson et al. | |
| 2018/0281095 A1* | 10/2018 | Aguirre Andonegui ..................... | |
| | | | B23K 9/321 |
| 2020/0004225 A1* | 1/2020 | Buller ................... | B29C 64/393 |
| 2020/0061922 A1* | 2/2020 | Meiners ................ | B29C 64/232 |
| 2021/0197477 A1 | 7/2021 | Pourcher et al. | |

OTHER PUBLICATIONS

China National Intellectual Property Administration, Notification to Go through Formalities of Registration, Application No. 201980072173. 5; dated Jan. 18, 2023, 7 pages.

\* cited by examiner

MODULAR SYSTEMS AND METHODS FOR PERFORMING ADDITIVE MANUFACTURING OF OBJECTS

TECHNICAL FIELD

The present disclosure relates generally to additive manufacturing; and more specifically, to modular systems and methods for performing additive manufacturing of objects.

BACKGROUND

Traditionally, while working on new designs, engineers are required to fabricate a prototype to test a validity of the designs. It will be appreciated that such a fabrication of the prototype entails an arduous process comprising designing a setup for performing such fabrication, setting up a production line, fabricating the prototype, finishing the fabrication (such as, by performing one or more super-finishing processes) and so forth. Recently, such arduous and time-consuming conventional processes for fabrication of prototypes have given way to faster processes of "rapid prototyping", for example, via three-dimensional (3D) printing. In such a process, a prototype of a new design can be conveniently designed on a computer using a computer-aided design (or CAD) software and subsequently, a fully-functional prototype can be printed on a 3D printer. Furthermore, not only has 3D printing been employed for printing new designs (such as, of machines, machine tools and so forth), but these days, 3D printing is also being employed for printing of products, including biological products such as tissues, organs and so forth via processes called 3D bioprinting.

The fabrication of prototypes and products by employing 3D printing may require a plurality of successive processes under varying environmental conditions and/or by employing different materials. In such an instance, conventional 3D printing requires a plurality of 3D printers for performing each of the successive process therein, by providing one or more of the varying environmental conditions and/or materials therein. Furthermore, transferring the product being printed from one 3D printer to another, without negatively affecting the product, can be difficult and time-consuming.

Generally, 3D bioprinting demands a high amount of accuracy for printing of such biomedical products. Consequently, a location of printing head of 3D bioprinters is required to be determined to a high amount of accuracy within the 3D bioprinter, prior to commencement of operation of the 3D bioprinter and also during the ongoing process. Moreover, the amount of material deposited by the printing head of the 3D bioprinter is required to be precisely tracked during the 3D bioprinting process, to ensure accurate fabrication of the corresponding biomedical products. However, conventional 3D bioprinters do not enable the accurate locating of the printing head and/or precise tracking of deposition of the material by the printing head.

Therefore, in light of the foregoing discussion, there exists a need to overcome the aforementioned drawbacks associated with conventional 3D printers, and specifically, 3D bioprinters.

SUMMARY

The present disclosure seeks to provide a modular system for performing additive manufacturing of an object. The present disclosure also seeks to provide a method for performing additive manufacturing of an object. Moreover, the present disclosure seeks to provide a software product recorded on machine-readable non-transient data storage media, wherein the software product is executable upon computing hardware to implement the aforementioned method.

The present disclosure seeks to provide a solution to the existing problem associated with conventional 3D printers and specifically, 3D bioprinters. An aim of the present disclosure is to provide a solution that overcomes at least partially the problems encountered in prior art and provide the modular system and the method to enable convenient, scalable and time-efficient additive manufacturing of objects, such as, biomedical products.

In one aspect, an embodiment of the present disclosure provides a modular system for performing additive manufacturing of an object, the system comprising:
  at least two additive manufacturing devices, wherein each of the at least two additive manufacturing devices comprises:
    a housing having two slots on lateral sides to accommodate a manufacturing tray, wherein the housing forms a hermetically-sealed chamber when the manufacturing tray is accommodated therein;
    a printer head and axis system accommodated within the housing; and
    a movement mechanism accommodated within the housing, wherein the movement mechanism is configured to move the manufacturing tray; and
  a control module operatively coupled to each of the at least two additive manufacturing devices, wherein the control module is configured to control the at least two additive manufacturing devices to:
  arrange the manufacturing tray in a first of the at least two additive manufacturing devices;
  print a part of the object on the manufacturing tray arranged in the first additive manufacturing device;
  move the manufacturing tray having the partially manufactured object to a second of the at least two additive manufacturing devices; and
  print a remaining part of the object on the manufacturing tray arranged in the second additive manufacturing device, to complete the additive manufacturing of the object.

In another aspect, an embodiment of the present disclosure provides a method for performing additive manufacturing of an object, the method comprising:
  providing at least two manufacturing devices, wherein each of the at least two additive manufacturing devices comprises a housing having two slots on lateral sides to accommodate a manufacturing tray, and wherein the housing forms a hermetically-sealed chamber when the manufacturing tray is accommodated therein;
  arranging the manufacturing tray in a first of the at least two additive manufacturing devices;
  printing a part of the object on the manufacturing tray arranged in the first additive manufacturing device;
  moving the manufacturing tray having the partially manufactured object to a second of the at least two additive manufacturing devices; and
  printing a remaining part of the object on the manufacturing tray arranged in the second additive manufacturing device, to complete the additive manufacturing of the object.

In yet another aspect, an embodiment of the present disclosure provides a software product recorded on machine-readable non-transient data storage media, wherein the software product is executable upon computing hardware to implement the aforesaid method for performing additive manufacturing of an object.

Embodiments of the present disclosure substantially eliminate or at least partially address the aforementioned problems in the prior art, and enable convenient, scalable and time-efficient additive manufacturing of objects, such as, biomedical products.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
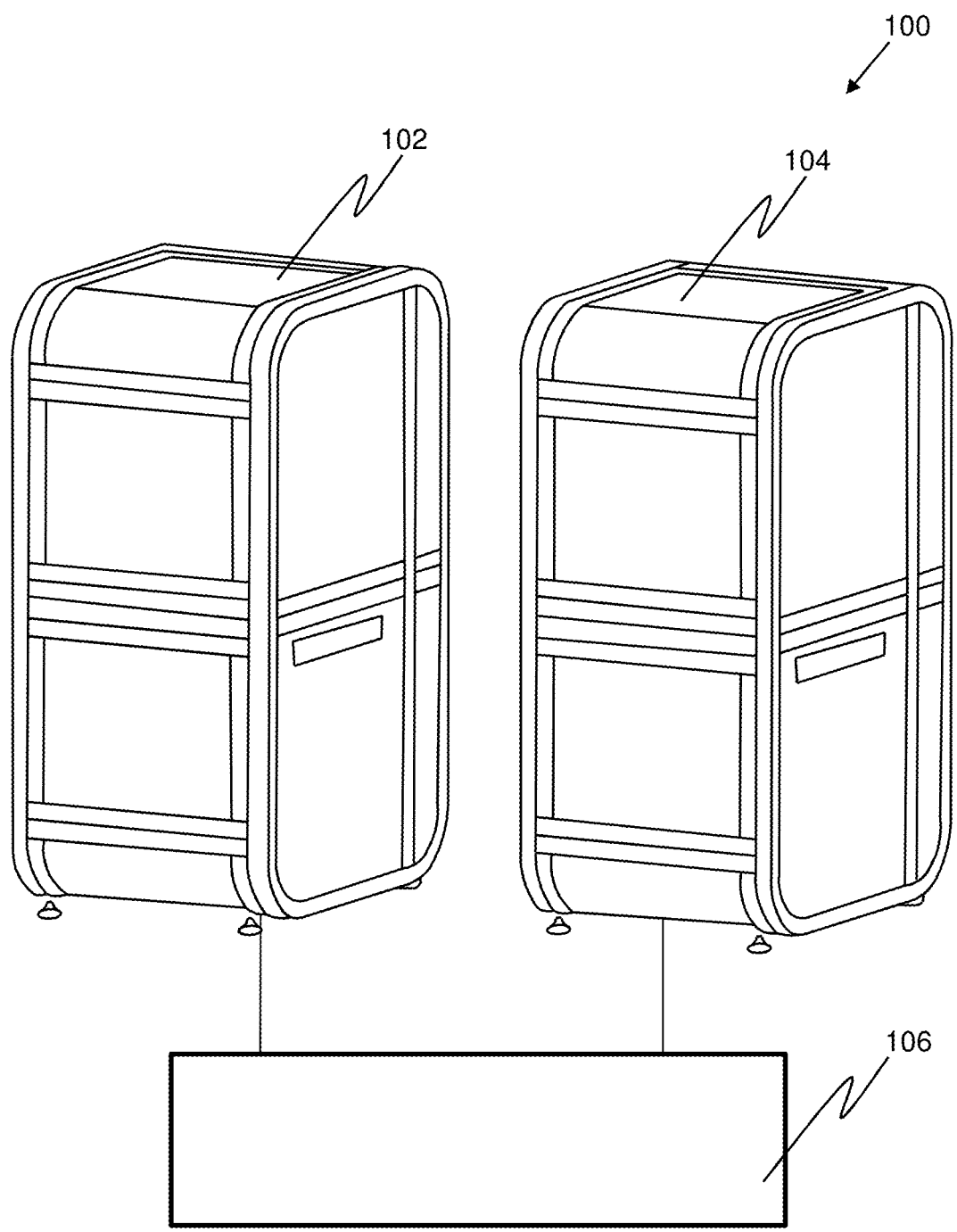
FIG. 1 is a perspective view of a modular system for performing additive manufacturing of an object, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a modular system for performing additive manufacturing of an object, the system comprising:

at least two additive manufacturing devices, wherein each of the at least two additive manufacturing devices comprises:
a housing having two slots on lateral sides to accommodate a manufacturing tray, wherein the housing forms a hermetically-sealed chamber when the manufacturing tray is accommodated therein;
a printer head and axis system accommodated within the housing; and
a movement mechanism accommodated within the housing, wherein the movement mechanism is configured to move the manufacturing tray; and
a control module operatively coupled to each of the at least two additive manufacturing devices, wherein the control module is configured to control the at least two additive manufacturing devices to:
arrange the manufacturing tray in a first of the at least two additive manufacturing devices;
print a part of the object on the manufacturing tray arranged in the first additive manufacturing device;
move the manufacturing tray having the partially manufactured object to a second of the at least two additive manufacturing devices; and
print a remaining part of the object on the manufacturing tray arranged in the second additive manufacturing device, to complete the additive manufacturing of the object.

In another aspect, an embodiment of the present disclosure provides a method for performing additive manufacturing of an object, the method comprising:
providing at least two manufacturing devices, wherein each of the at least two additive manufacturing devices comprises a housing having two slots on lateral sides to accommodate a manufacturing tray, and wherein the housing forms a hermetically-sealed chamber when the manufacturing tray is accommodated therein;
arranging the manufacturing tray in a first of the at least two additive manufacturing devices;
printing a part of the object on the manufacturing tray arranged in the first additive manufacturing device;
moving the manufacturing tray having the partially manufactured object to a second of the at least two additive manufacturing devices; and
printing a remaining part of the object on the manufacturing tray arranged in the second additive manufacturing device, to complete the additive manufacturing of the object.

In yet another aspect, an embodiment of the present disclosure provides a software product recorded on machine-readable non-transient data storage media, wherein the software product is executable upon computing hardware to implement the aforesaid method for performing additive manufacturing of an object.

The modular system and the method enable additive manufacturing of objects, such as, by employing 3D printing processes. The modular system comprises at least two additive manufacturing devices, wherein the manufacturing tray can be moved between the at least two additive manufacturing devices. Furthermore, a different set of manufacturing conditions (such as, environmental conditions of temperature, pressure, humidity, air quality and so forth) can be provided in each of the at least two additive manufacturing devices and also, different materials can be employed for manufacturing the object in each of the at least two additive manufacturing devices. Therefore, the modular system and method enable convenient manufacturing of objects that require a plurality of successive processes under varying environmental conditions and/or by employing different materials. It will be appreciated that as the manufacturing tray can be moved between the at least two manufacturing devices, the manufacturing of the object under the varying environmental conditions and/or by employing different materials can be automated, thereby necessitating reduced human invention and improving an accuracy associated with the manufacturing of the object. Furthermore, the modular system and method enable accurate determination of location of printer head in each of the at least two manufacturing devices and also, precise tracking of an amount of material dispensed by such printer heads, thereby reducing errors associated with manufacturing and further improving the accuracy associated with the manufacturing of the object. Moreover, one or more additional additive manufacturing devices can be easily added to the modular system, thereby, improving a scalability of the modular system. Thus, the system and the method enable to substantially overcome various drawbacks associated with conventional 3D printers (such as 3D bioprinters) and enable convenient, scalable and time-efficient additive manufacturing of objects, such as, biomedical products.

The system comprises at least two additive manufacturing devices. Throughout the present disclosure, the term "additive manufacturing" refers to a manufacturing process employing data computer-aided-design (CAD) software or a three-dimensional (3D) object scanner to direct hardware (such as the additive manufacturing devices) to deposit material, layer-upon-layer, in precise geometric shapes. Notably, the additive manufacturing involves addition or deposition of thousands of minuscule layers of the material (such as metal powder, thermoplastics, ceramics, composites, glass, edibles and so forth) that are combined to create the object. The modular system comprises the at least two additive manufacturing devices, wherein the at least two additive manufacturing devices are used to manufacture or fabricate the object ranging from a few millimetres to many centimetres in size (such that a size of the object capable of being fabricated depends on a size of a housing of the additive manufacturing devices, described in detail herein later). The system may also comprise any further number of additive manufacturing devices, such as three, four, five, six, seven or more additive manufacturing devices. Most typically, the system would then pass the manufacturing tray from a first device to a second, then to a third, to a fourth and so on, in a linear manner, but it would also be possible to pass the manufacturing tray back and forth.

Optionally, each of the at least two additive manufacturing devices is implemented as a three-dimensional (3D) bioprinter. Throughout the present disclosure, the term "3D bioprinting" refers to techniques employed for manufacturing (or fabrication) of biomedical products (such as, products having natural tissue characteristics) by employing cells, growth factors, and/or biomaterials as printing materials. Notably, the 3D bioprinter is a device employed for 3D bioprinting. The at least two additive manufacturing devices are implemented as 3D bioprinters for manufacturing tissues, organs and so forth.

Furthermore, each of the at least two additive manufacturing devices comprises the housing having two slots on lateral sides to accommodate the manufacturing tray, wherein the housing forms the hermetically-sealed chamber when the manufacturing tray is accommodated therein. The additive manufacturing devices comprise the housing that can be implemented to have a substantially cuboidal shape. Furthermore, each of two side faces of the housing has a slot therein, to enable the accommodation of the manufacturing tray within the housing. The manufacturing tray is detachably attached within the housing of the manufacturing devices, such that once the manufacturing tray is accommodated within the housing, the housing and the manufacturing tray form the hermetically-sealed chamber. The hermetically-sealed chamber is essential to create controlled environment conditions inside the housing of the additive manufacturing devices (such as a predefined temperature, pressure, humidity, air quality and so forth). It will be appreciated that a width of the slots on the lateral sides of the housing is substantially the same (such as, to within 95%) as a width of the manufacturing tray, thereby enabling the hermetic sealing of the housing.

Furthermore, the printer head and an axis system is accommodated within the housing. The printer head is configured to dispense the material that is being used for the manufacturing of the object. The printer head comprises a XYZ-unit (i.e. an axis system) operable to enable movement of a plurality of changeable tools. The tools may for example be implemented to have a syringe-like structure. The plurality of changeable tools enables dispersion of the material in a controlled manner, such that the printer head continuously dispenses minute amount of material therefrom. The XYZ-unit can comprise electrics and pneumatics therein, to enable the movement of the plurality of changeable tools. Moreover, the plurality of changeable tools has one end fixed in the XYZ-unit such that the plurality of changeable tools is configured to have at least three degrees of freedom. The plurality of changeable tools is configured to move linearly along at least three axes (such as x-axis, y-axis and z-axis). Optionally, the plurality of changeable tools is configured to rotate about each of the three axes (such as x-axis, y-axis and z-axis) and consequently the plurality of changeable tools has six degrees of freedom. The material being dispensed from the printer head may be in a powdered form, in a liquid form, in a form of a wire and so forth. The material in the powdered form may be partially or completely melted in order to print the object. For example, the material used in additive manufacturing can be one of: titanium, steel, aluminium, copper alloys, superalloys and so forth. The material is dispensed from the printer head such that a desired object starts getting manufactured on the manufacturing tray accommodated in one of the additive manufacturing devices.

Furthermore, the movement mechanism is accommodated within the housing, wherein the movement mechanism is configured to move the manufacturing tray. The housing comprises the movement mechanism configured to move the manufacturing tray, such that the manufacturing tray gets accommodated into a housing of an adjacent additive manufacturing device through the slots provided in the housing of the adjacent additive manufacturing device.

Optionally, the housing further comprises a top portion detachably coupled to a bottom portion, and wherein the top portion accommodates the printer head and the bottom portion accommodates the manufacturing tray and the movement mechanism. The housing comprises the top portion and the bottom portion, wherein the top portion of the housing comprises the printer head that dispenses the material for the additive manufacturing. The top portion of the housing is detachably coupled to the bottom portion, such that the top portion detaches from the bottom portion if required, such as when the printer head is required to be changed. Notably, the top portion and the bottom portion possess a same cross-section along an open bottom face of the top portion and an open top face of the bottom portion, such that when the top portion is placed over the bottom portion, edges of the top portion and the bottom portion coincide, thereby forming the housing. Moreover, the bottom portion accommodates the manufacturing tray and the movement mechanism, wherein the movement mechanism is accommodated below the manufacturing tray.

Optionally, the movement mechanism comprises at least a conveyor unit for providing horizontal movement to the manufacturing tray and a lift unit for providing vertical movement to the manufacturing tray. The movement mechanism is employed for the movement of the manufacturing tray within the housing and/or from one housing to another housing of the adjacent manufacturing unit. The movement mechanism comprises the conveyor unit that comprises a conveyor belt over which the manufacturing tray is placed during operation of the system. The conveyor belt rotates, thereby providing the horizontal movement to the manufacturing tray. The lift unit is arranged below the manufacturing tray and is configured to provide the vertical movement to the manufacturing tray. The lift unit can be implemented using a piston-cylinder arrangement, wherein the piston moves upwards with respect to the cylinder to provide an upward movement to the manufacturing tray and the piston moves downwards to provide a downward movement to the manufacturing tray.

Furthermore, the control module is operatively coupled to each of the at least two additive manufacturing devices. The control module refers to hardware and/or software that is operable to implement specific algorithms therein, to perform specific operations associated with performing additive manufacturing of objects (such as for starting the manufacturing process, ending the manufacturing process, controlling an amount of material to be dispensed from the printer head and so forth). The control module employs a processor configured to perform the abovementioned operations. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. Furthermore, the term "processor" may refer to one or more individual processors, processing devices and various elements associated with the control module. Additionally, the one or more individual processors, processing devices and elements are arranged in various architectures for responding to and processing the instructions that drive the system (such as the additive manufacturing devices). The control module is operatively coupled to each of the two additive manufacturing devices to perform the abovementioned specific operations. Likewise, when more than two manufacturing devices are used, preferably a single control module is used for all the devices. It is naturally also possible to use more than one control module, in which case the control modules would communicate with one another.

Optionally, each of the at least two additive manufacturing devices further comprises a light gate arrangement configured to determine movement along three mutually orthogonal directions, and wherein each of the light gate arrangements comprise a light source and an optical transceiver. The light gate arrangements are provided in each of the additive manufacturing devices to determine movement along the three mutually orthogonal directions, such as along three mutually perpendicular axes according to cartesian coordinate system (such as x-axis, y-axis and z-axis). The light gate arrangements comprise the light source and the optical transceiver (such as an optical sensor). The light source emits a light (for example, visible light, blue light, ultraviolet light, infrared light and so forth) and the optical transceiver receives the light emitted by the light source. Furthermore, the optical transceiver is configured to generate a voltage when the light emitted by the light source is not received at the transceiver, such as, due to obstruction of the emitted light by an object. The optical transceiver is configured to sense the object and subsequently, determine a time taken by the object to cross the light emitted by the light source. The optical transceiver converts the determined time taken to a corresponding voltage value, thereby determining the movement of the object along any of the three mutually orthogonal directions. It will be appreciated that at least two light gate arrangements are employed in the housing to determine the movement of the object along the three mutually orthogonal directions.

Optionally, the control module is configured to calibrate the printer heads of each of the at least two additive manufacturing devices using corresponding light gate arrangements, by determining movement of the printer heads along three mutually orthogonal directions within the corresponding additive manufacturing devices. The printer heads in each of the additive manufacturing devices are calibrated using the light gate arrangements, such as, the printer head is configured to move along two axes (the x-axis and the y-axis) that gives an initial position of the printing head in the housing. The optical transceiver of the light gate arrangements is configured to change an output voltage when the printer head crosses the light emitted by the corresponding light source, such as, when the printer head crosses the light. The printer head is made to move through the light of the light gate arrangements along both directions with respect to the x-axis and the y-axis. The printer head is configured to move in a forward direction and a backward direction through the light gate employed on the x-axis. Furthermore, an average of time taken by the printer head for cutting the light associated with x-axis is measured. Subsequently, the printer head is configured to move in a forward direction and a backward direction through the light gate employed on the y-axis. Furthermore, an average of the time taken by the printer head for cutting the light associated with the y-axis is measured. The position on the printer head at the average of the time taken by the printer head to cross an axis (the x-axis or the y-axis), wherein such an average of time corresponds to a mid-point position on the printer head, is taken as the centre of the printer head. Moreover, the printer head is lowered such that the printer head cuts either the light emitted by the light gate employed on the x-axis or the y-axis. Subsequently, when a change in voltage value is detected by the optical transceiver associated with either the light gate employed on the x-axis or the y-axis respectively, the printer head is determined to have a specific position with respect to the z-axis. However, as such a position of the printer head is determined with respect to a position (or elevation) of the corresponding light source along the z-axis, the determined position of the printer head along the z-axis is corrected by using the position of the light source along the z-axis. Consequently, the printer head is calibrated along the z-axis.

Optionally, each of the light sources is configured to emit a disinfectant light. The light sources of each of the light gate arrangements emit a disinfectant light, such as a blue light, ultraviolet light and so forth, in order to disinfect the printer heads during calibration thereof. It will be appreciated that if during the manufacturing process, the printer heads are contaminated, the quality of the object manufactured gets negatively affected, therefore, the printer heads are disinfected before calibration such that the material is dispensed through uncontaminated printer heads. For example, when the printer heads move through the blue light emitted by the light sources, the printer heads get disinfected. Subsequently, the disinfected printer heads are used in 3D bioprinters for the manufacture of drugs, tissues, organs, and so forth. In such an example, the printer head that dispenses the biomedical material for the manufacture of drugs, tissues, organs and so forth, is disinfected before calibration by passing the printer head through the light gate arrangement (through the blue light).

Furthermore, the control module is configured to control the additive manufacturing device to arrange the manufacturing tray in one of the at least two additive manufacturing devices. The control module is operatively coupled to the movement mechanism, such as to the conveyor unit and the lift unit. The control module is configured to operate the movement mechanism to arrange the manufacturing tray in one of the additive manufacturing devices. For example, an operator positions the manufacturing tray in the housing of the manufacturing unit. The control module is configured to control the additive manufacturing device to arrange the manufacturing tray, such as, by adjusting a horizontal and/or vertical position thereof within the additive manufacturing device. Consequently, the horizontal and/or vertical position of the manufacturing tray within the additive manufacturing device corresponds to a predefined position thereof, such as, to allow commencement of printing of the object on the manufacturing tray.

Optionally, each of the at least two additive manufacturing devices further comprises a microscope vision arrangement, and wherein the microscope vision arrangement comprises: at least one optical device and at least one camera operatively coupled to the control module. The microscope vision arrangement comprising the optical device and the camera is employed, wherein the optical device and the camera are operatively coupled to the control module. The optical device can be implemented as a lens that is configured to provide a high-quality magnification for the camera, such as, when the lens is arranged in front of the camera.

Optionally, the control module is configured to employ the microscope vision arrangement to capture at least one image of the object being manufactured on the manufacturing tray. The control module instructs the microscope vision arrangement to capture at least image of the object being manufactured in the additive manufacturing device, such as, at predefined time-intervals during the manufacturing of the object (or alternatively, continuously during the manufacturing of the object). Notably, the microscope vision arrangement is configured to capture images of the object from 360° around the object (such as, from a top, bottom, left, right, front and rear thereof). Therefore, it is possible to capture the images of the object being manufactured from all the possible angles within the housing.

Furthermore, the control module is configured to analyse the at least one image (obtained from the microscope vision arrangement) to determine a location of a critical component associated with the object. The term "critical component" as used throughout the present disclosure, refers to a portion of the object being manufactured, wherein such a portion has already been printed on the manufacturing tray by the printer head. Furthermore, the portion of the object can serve as a point of origin (or nexus) for further printing of the object until complete manufacturing thereof. The at least one image captured by the camera of the microscope vision arrangement is analysed, to determine a location of the critical component on the manufacturing tray. For example, the object being manufactured is a tissue and a captured image of the manufacturing tray indicates presence of a cell printed thereon. In such an example, the printed cell is the critical component for manufacturing the tissue and is taken as a point of origin for printing of a remainder of the tissue.

Moreover, the control module is configured to define a critical path for completing the manufacturing of the object, based on the determined location of the critical component. The term "critical path" as used throughout the present disclosure, relates to an optimised path taken by the printer head to dispense material onto the manufacturing tray to manufacture the object. The control module is operable to acquire the location of the critical component from the microscope vision arrangement after analysis of the at least one image. Thereafter, the control module is operable to create the critical path for completing the manufacturing of the object, based on the determined location of the critical component and information provided to the control module by a software application employed for manufacturing the object (such as a computer aided design or CAD software). In the aforementioned example, the control module is operable to acquire a 3D CAD model of the tissue provided by a software application used for manufacturing the tissue. Subsequently, the control module is operable to generate the critical path for printing the tissue based on the determined location of the cell (as the point of origin) and the 3D CAD model of the tissue.

Optionally, the control module is configured to employ the microscope vision arrangement to determine at least one of: a location and/or a volume of the object being manufactured on the manufacturing tray. The microscope vision arrangement is configured to capture at least one image of the object being manufactured that determines the location of the object being manufactured on the manufacturing tray. Moreover, the at least one image of the object determines the volume of object being manufactured, such as the amount of material being dispensed from the printer head. Subsequently, the control module records the location, and/or the volume of the object being manufactured on the manufacturing tray determined by the microscope vision arrangement. In an example, a medicinal pill comprising three different salts in predefined quantities, is required to be manufactured using the additive manufacturing process. The amount of salts dispensed from the printer heads is required to be accurately dispensed, therefore, it is constantly monitored using the microscope vision arrangement. The information about the volume of the object, such as, the medicinal pill is recorded by the control module in order to ensure that the medicinal pill is being accurately manufactured.

Furthermore, the control module is configured to receive a predefined location and/or a predefined volume for the object being manufactured on the manufacturing tray. The control module is configured to receive and subsequently, analyse a 3D CAD model of the object that needs to be manufactured. Furthermore, based on the analysis of the 3D CAD model of the object, the control module receives the predefined location and/or predefined volume of the material to be dispensed for manufacturing the object. The predefined location may be an initial location on the manufacturing tray from where the additive manufacturing process should commence. Moreover, the predefined volume may be an amount of material that is required to be dispensed from the printer head for manufacturing the object.

Furthermore, the control module is configured to compare the location and/or the volume with the predefined location and/or the predefined volume respectively. The control module compares the recorded location, and/or the recorded volume of the object being manufactured with the predefined location and/or the predefined volume of the object being manufactured respectively. Consequently, the control module is configured to observe a deviation (a difference) between the recorded and the predefined location and/or volume respectively.

Furthermore, the control module upon determination of a deviation of the location and/or the volume from the predefined location and/or the predefined volume respectively, the control module is operable to correct the determined deviation in the location and/or the volume of the object being manufactured to correspond to the predefined location and/or the predefined volume respectively. When the control module determines the deviation of the location and/or the volume from the predefined location and/or the predefined volume of the object respectively, the control module corrects the deviation, thereby achieving the location and/or the volume of the object being manufactured same as that of the predefined location and/or the predefined volume as received from the 3D CAD model.

Alternatively, the control module terminates the manufacturing of the object if the determined deviation is unsuccessfully corrected. The control module terminates the manufacturing of the object being manufactured when the control module is unable to correct the deviation in the location and/or the volume of the object being manufactured in order to avoid faulty object being manufactured. For example, the control module records the volume of salt being dispensed from the printer head. If, for a medicinal pill, the recorded volume of the salt exceeds the predefined volume of the salt as determined from the 3D CAD model, the control module is configured to achieve the volume being dispensed equal to the predefined volume of the salt by correcting the volume of the salt being dispensed from the printer head. Moreover, if the control module unsuccessfully corrects the volume of the salt being dispensed from the printer head, the control module terminates the manufacturing of the medicinal pill.

Furthermore, the control module is configured to generate an alarm. The control module generates the alarm when the control module terminates the additive manufacturing process. The alarm is configured to alert the operator about the termination of the additive manufacturing process. For example, the alarm may be implemented within the additive manufacturing device itself. In such an example, the alarm may comprise emitting an alarm signal. The alarm signal may be in a form of a loud noise or in a form of a visual representation such that one or more operators are able to observe the generated alarm signal. In another example, the one or more operators may receive a notification on the smartphones used by the operators.

Furthermore, the control module is configured to create an error log comprising data associated with the determined deviation. The control module records the data comprising the determined deviations associated with the locations and/or volume of the object being manufactured. The error log created by the control module is used by the operator to maintain a record of the additive manufacturing process performed by the additive manufacturing devices.

Furthermore, the control module is configured to control the additive manufacturing device to print the part of the object on the manufacturing tray arranged in the additive manufacturing device. The control module is configured to determine the volume of material to be dispensed from the printer head. Moreover, the control module determines the time period for which the material is dispensed from the printer head. For example, the object to be manufactured is composed of two different components. The part of the object composed of a single type of material (such as aluminium) is printed in one of the additive manufacturing devices as the printer head dispenses the aluminium therefrom. Therefore, the part of the object comprising aluminium is manufactured on the manufacturing tray of the additive manufacturing device.

Furthermore, the control module is configured to control the additive manufacturing device to move the manufacturing tray having the partially manufactured object to another of the at least two additive manufacturing devices. In such an instance, once the object is partially manufactured in one of the additive manufacturing devices, the control module instructs the movement mechanism thereof to move the manufacturing tray to the adjacent additive manufacturing device (such as another of the at least two additive manufacturing devices) for the completion of rest of the additive manufacturing process. Notably, the manufacturing tray is configured over the conveyer belt, wherein the conveyer belt is operable to move the manufacturing tray along with the partially manufactured object from one of the additive manufacturing devices to the adjacent additive manufacturing device. It will be appreciated that the partially manufactured object may be in a semi-solid state or a solid state while being transferred to the adjacent additive manufacturing device along with the manufacturing tray.

Furthermore, the control module is configured to control the additive manufacturing device to print the remaining part of the object on the manufacturing tray arranged in the other additive manufacturing device, to complete the additive manufacturing of the object. The control module is operable to instruct the printer head accommodated within the housing of the adjacent (other) additive manufacturing device to manufacture the remaining part of the object. Referring to the abovementioned example, the remaining part of the object composed of another type of material (such as copper) is printed in the adjacent (other) additive manufacturing device. The printer head of the adjacent (other) additive manufacturing device dispenses copper over the partially manufactured object composed of aluminium, such as at specific places, to complete the additive manufacturing of the object.

It will be appreciated that the at least two additive manufacturing devices may be more than two additive manufacturing devices, such that the manufacturing tray is moved from one additive manufacturing device to the adjacent additive manufacturing device as per the requirement of the additive manufacturing process. Notably, the additive manufacturing devices may have different controlled environment conditions. Moreover, the printer heads of the additive manufacturing devices may be of different sizes and may be employed to dispense different materials from each of the additive manufacturing devices. Therefore, the completion of the additive manufacturing process may proceed in more than two additive manufacturing devices (for example, when more than two materials are required for the manufacturing of the object). For example, the additive manufacturing devices may be four additive manufacturing devices, wherein each of the additive manufacturing device comprise printer heads of different sizes. Furthermore, the printer heads are configured to dispense four different materials to manufacture a single object. Moreover, the controlled environment conditions in each of the housings of the additive manufacturing devices may vary.

In one example, an artificial liver is being 3D printed using additive manufacturing process. The operator places the manufacturing tray in the first additive manufacturing device. The control module controls the additive manufacturing device to arrange the manufacturing tray in the first additive manufacturing device. Furthermore, a layer of human fibroblasts is printed using the printer head of the first additive manufacturing device. The artificial liver is partially printed on the manufacturing tray. The control module is configured to employ the movement mechanism to move the manufacturing tray in an adjacent additive manufacturing device (such as the second additive manufacturing device) along with the partially printed artificial liver. Moreover, a 250-micron layer of human vascular smooth muscle cell is then printed in the second additive manufacturing device using a printer head of the second additive manufacturing device. Furthermore, the control module is configured to employ the movement mechanism to move the manufacturing tray from the second additive manufacturing device to a third additive manufacturing device along with the partially printed artificial liver comprising human fibroblasts and human vascular smooth muscle cells. Moreover, a thin coating of human vascular endothelial cells is printed in the third additive manufacturing device using a printer head of the third additive manufacturing device.

The present disclosure also relates to the method as described above. Various embodiments and variants disclosed above apply mutatis mutandis to the method.

Optionally, the method comprises calibration of the printer heads of each of the at least two additive manufacturing devices, by determining movement of the printer heads along three mutually orthogonal directions within the corresponding additive manufacturing devices. According to another embodiment, the method further comprises disinfecting the printer heads using a disinfectant light. The method may also further comprise capturing at least one image of the object being manufactured on the manufacturing tray; analysing the at least one image to determine a location of a critical component associated with the object; and defining a critical path for completing the manufacturing of the object, based on the determined location of the critical component.

Optionally, the method further comprises determining at least one of: a location and/or a volume of the object being manufactured on the manufacturing tray; receiving a predefined location and/or a predefined volume for the object being manufactured on the manufacturing tray; and comparing the location and/or the volume with the predefined location and/or the predefined volume respectively; and wherein upon determination of a deviation of the location and/or the volume from the predefined location and/or the predefined volume respectively, the method comprises: correcting the determined deviation in the location and/or the volume of the object being manufactured to correspond to the predefined location and/or the predefined volume respectively; or terminating the manufacturing of the object if the determined deviation is unsuccessfully corrected; generating an alarm; and creating an error log comprising data associated with the determined deviation.

The present description relates also to a system for performing additive manufacturing of an object, the system comprising at least one additive manufacturing device comprising
- a housing having a slot on a lateral side or a bottom side to accommodate a manufacturing tray, wherein the housing forms a hermetically-sealed chamber when the manufacturing tray is accommodated therein;
- a printer head and axis system accommodated within the housing; and
- an interface to a control module.

In other words, the present embodiments and variants are also usable in a system that comprises one additive manufacturing device. According to an embodiment, the manufacturing device further comprises a movement mechanism accommodated within the housing, wherein the movement mechanism is configured to move the manufacturing tray. The system may further comprise other manufacturing devices and/or machining tools arranged alongside the additive manufacturing device, such as robots for attaching components or ovens for curing the 3D-printed parts.

DETAILED DESCRIPTION OF THE DRAWINGS

Referring to FIG. 1, there is shown a perspective view of a modular system 100 for performing additive manufacturing of an object, in accordance with an embodiment of the present disclosure. As shown, the modular system 100 comprises two additive manufacturing devices 102 and 104 (shown in greater detail in FIG. 2). Furthermore, each of the two additive manufacturing devices 102 and 104 is implemented as a three-dimensional (3D) bioprinter. Furthermore, a control module 106, connected to both additive manufacturing devices is shown.

Figure 2:
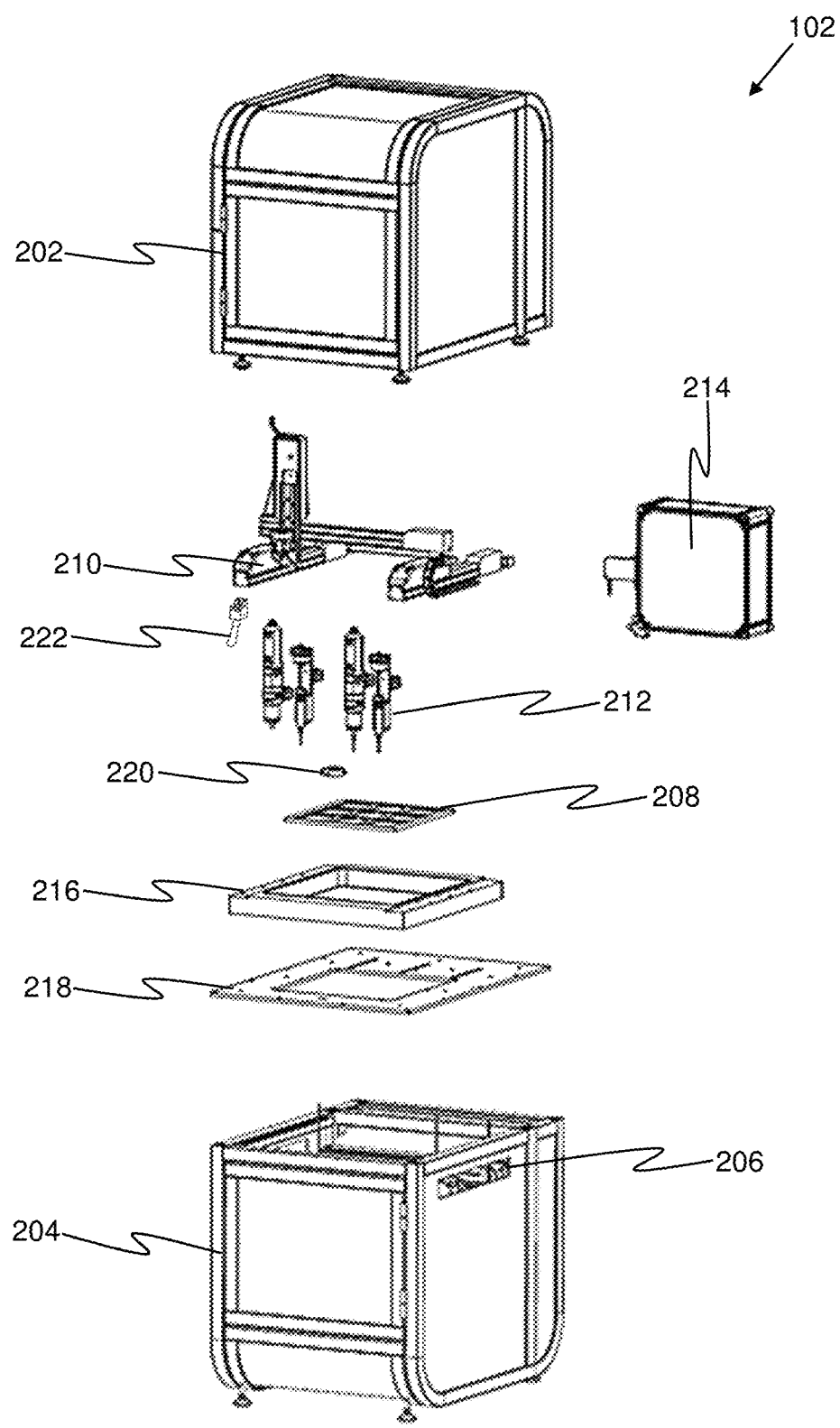
FIG. 2 is an exploded view of the additive manufacturing device of FIG. 1, in accordance with an embodiment of the present disclosure.

Referring to FIG. 2, there is shown an exploded view of the additive manufacturing device 102 of FIG. 1, in accordance with an embodiment of the present disclosure. The additive manufacturing device 102 comprises a housing 202-204 having two slots 206 on lateral sides to accommodate a manufacturing tray 208, wherein the housing 202-204 forms a hermetically-sealed chamber when the manufacturing tray 208 is accommodated therein. Furthermore, the housing 202-204 further comprises a top portion 202 detachably coupled to a bottom portion 204. The top portion 202 accommodates the printer head 210-212 and the bottom portion 204 accommodates the manufacturing tray 208 and the movement mechanism (not shown). As shown, the printer head 210-212 comprises a XYZ-unit 210 and a plurality of changeable tools 212 (implemented as a plurality of syringe needles), wherein the XYZ-unit 210 is configured to enable movement of the plurality of changeable tools 212. The additive manufacturing device 102 comprises an electrics and pneumatics unit 214 that allows of the changeable tools 212 via the XYZ-unit 210.

Moreover, the additive manufacturing device 102 comprises an open granite table 216 and an open bottom plate 218 coupled to the manufacturing tray 208 during operation of the modular system 100. Furthermore, the modular system 100 comprises a light gate arrangement 220 (shown in greater detail in FIG. 3) configured to determine movement of the changeable tools 212 along three mutually orthogonal directions, such as, for calibration of the printer head 210-212. Moreover, the modular system 100 comprises a microscope vision arrangement 222.

Figure 3:
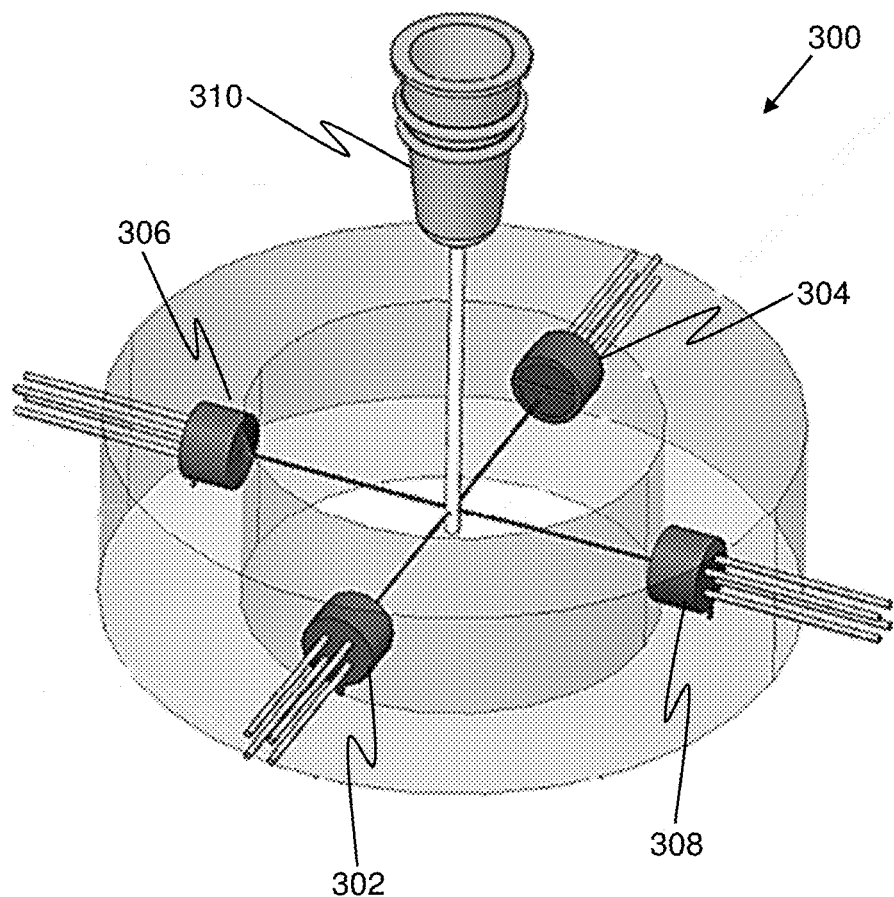
FIG. 3 is a perspective view of a light gate arrangement (such as the light gate arrangement of FIG. 2), in accordance with an embodiment of the present disclosure.

Referring to FIG. 3, there is shown a perspective view of a light gate arrangement 300 (such as the light gate arrangement 220 of FIG. 2), in accordance with an embodiment of the present disclosure. As shown, the light gate arrangement 300 comprises a first light gate and a second light gate arranged mutually orthogonally with respect to each other. Furthermore, the first light gate comprises a light source 302 and an optical transceiver 304 and the second light gate comprises a light source 306 and an optical transceiver 308. The light gate arrangement 300 is configured to determine movement of printer head 310 along three mutually orthogonal directions (such as, along x-axis, y-axis and z-axis respectively).

Figure 4:
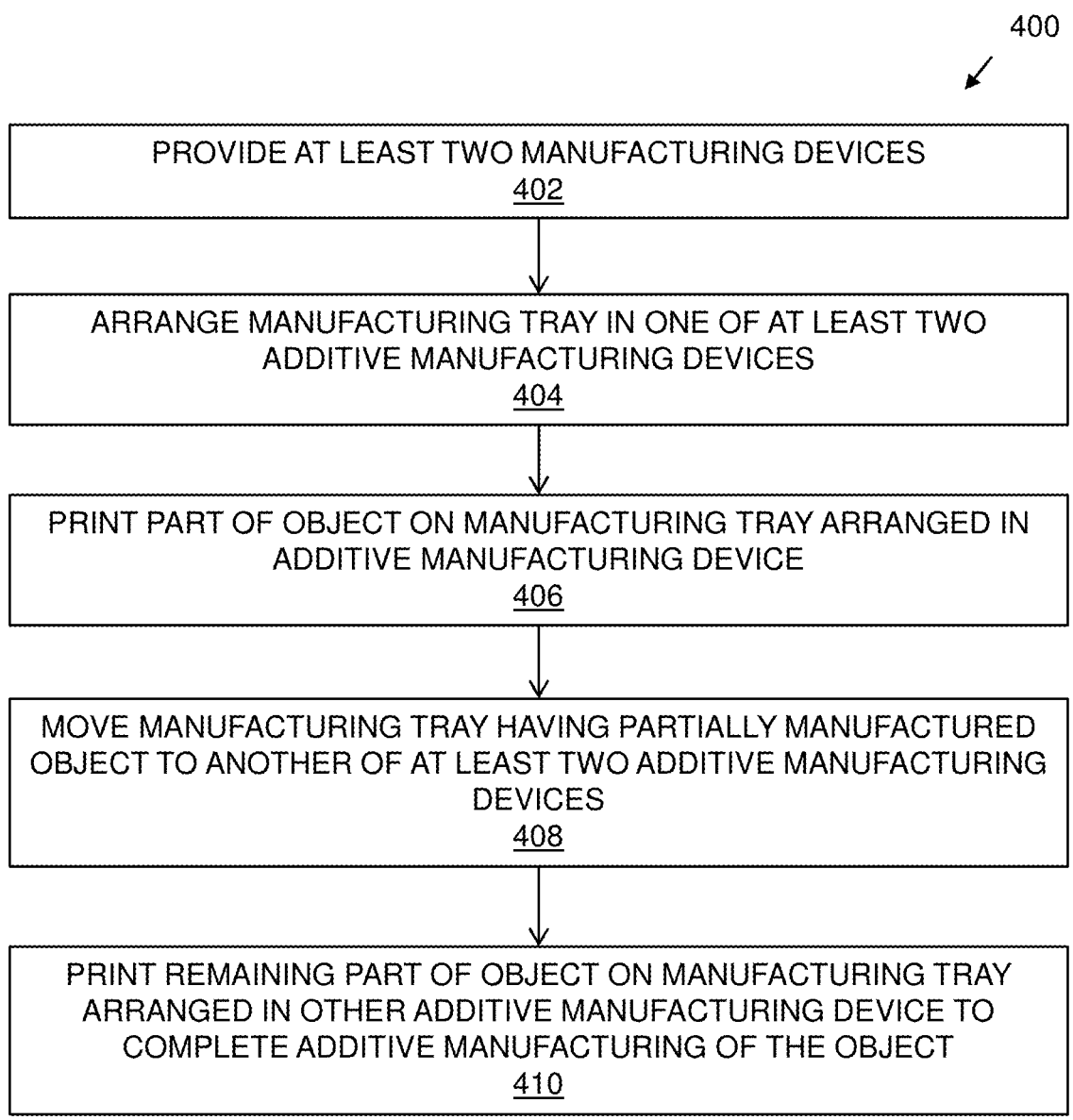
FIG. 4 is an illustration of steps of a method for performing additive manufacturing of an object, in accordance with an embodiment of the present disclosure.

Referring to FIG. 4, there are shown steps of a method 400 for performing additive manufacturing of an object, in accordance with an embodiment of the present disclosure. At a step 402, at least two manufacturing devices are provided, wherein each of the at least two additive manufacturing devices comprises a housing having two slots on lateral sides to accommodate a manufacturing tray. The housing forms a hermetically-sealed chamber when the manufacturing tray is accommodated therein. At a step 404, the manufacturing tray is arranged in one of the at least two additive manufacturing devices. At a step 406, a part of the object is printed on the manufacturing tray arranged in the additive manufacturing device. At a step 408, the manufacturing tray having the partially manufactured object is moved to another of the at least two additive manufacturing devices. At a step 410, a remaining part of the object is printed on the manufacturing tray arranged in the other additive manufacturing device, to complete the additive manufacturing of the object.

The steps 402 to 410 are only illustrative and other alternatives can also be provided where one or more steps are added, one or more steps are removed, or one or more steps are provided in a different sequence without departing from the scope of the claims herein. For example, the method 400 further comprises calibrating of the printer heads of each of the at least two additive manufacturing devices, by determining movement of the printer heads along three mutually orthogonal directions within the corresponding additive manufacturing devices. In another example, the method 400 further comprises disinfecting the printer heads using a disinfectant light. In yet another example, the method 400 further comprises capturing at least one image of the object being manufactured on the manufacturing tray; analysing the at least one image to determine a location of a critical component associated with the object; and defining a critical path for completing the manufacturing of the object, based on the determined location of the critical component.

For example, the method 400 further comprises determining at least one of: a location and/or a volume of the object being manufactured on the manufacturing tray; receiving a predefined location and/or a predefined volume for the object being manufactured on the manufacturing tray; and comparing the location and/or the volume with the predefined location and/or the predefined volume respectively; and wherein upon determination of a deviation of the location and/or the volume from the predefined location and/or the predefined volume respectively, the method comprises correcting the determined deviation in the location and/or the volume of the object being manufactured to correspond to the predefined location and/or the predefined volume respectively; or terminating the manufacturing of the object if the determined deviation is unsuccessfully corrected; generating an alarm; and creating an error log comprising data associated with the determined deviation.

Modifications to the embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for performing additive manufacturing of an object, the method comprising:
providing at least two manufacturing devices, wherein each of the at least two additive manufacturing devices comprises a housing having two slots on lateral sides to accommodate a manufacturing tray, and wherein the housing forms a hermetically-sealed chamber when the manufacturing tray is accommodated therein;
arranging the manufacturing tray in a first additive manufacturing device of the at least two additive manufacturing devices;
printing a part of the object on the manufacturing tray arranged in the first additive manufacturing device;
moving the manufacturing tray having the partially manufactured object to a second of the at least two additive manufacturing devices; and
printing a remaining part of the object on the manufacturing tray arranged in the second additive manufacturing device, to complete the additive manufacturing of the object.

2. The method according to claim 1, further comprising calibrating printer heads of the at least two additive manufacturing devices by determining movement of the printer heads along three mutually orthogonal directions within corresponding additive manufacturing devices.

3. The method according to claim 2, further comprising disinfecting the printer heads using a disinfectant light.

4. The method according to claim 1, further comprising:
capturing at least one image of the object being manufactured on the manufacturing tray;
analyzing the at least one image to determine a location of a critical component associated with the object; and
defining a critical path for completing the manufacturing of the object based on the determined location of the critical component.

5. The method according to 1, further comprising:
determining one or more of a location and a volume of the object being manufactured on the manufacturing tray;
receiving one or more of a predefined location and a predefined volume for the object being manufactured on the manufacturing tray; and
comparing one or more of the location and the volume with the predefined location and the predefined volume respectively; and
wherein upon determination of a deviation of one or more of the location and the volume from the predefined location and the predefined volume respectively, the method comprises:
correcting the determined deviation in one or more of the location and the volume of the object being manufactured to correspond to the predefined location and the predefined volume respectively; or
terminating the manufacturing of the object if the determined deviation is unsuccessfully corrected and generating an alarm; and
creating an error log comprising data associated with the determined deviation.

* * * * *